Nov. 10, 1931.  F. A. KOLSTER  1,831,011
RADIO BEACON SYSTEM
Filed June 23, 1928  3 Sheets-Sheet 1
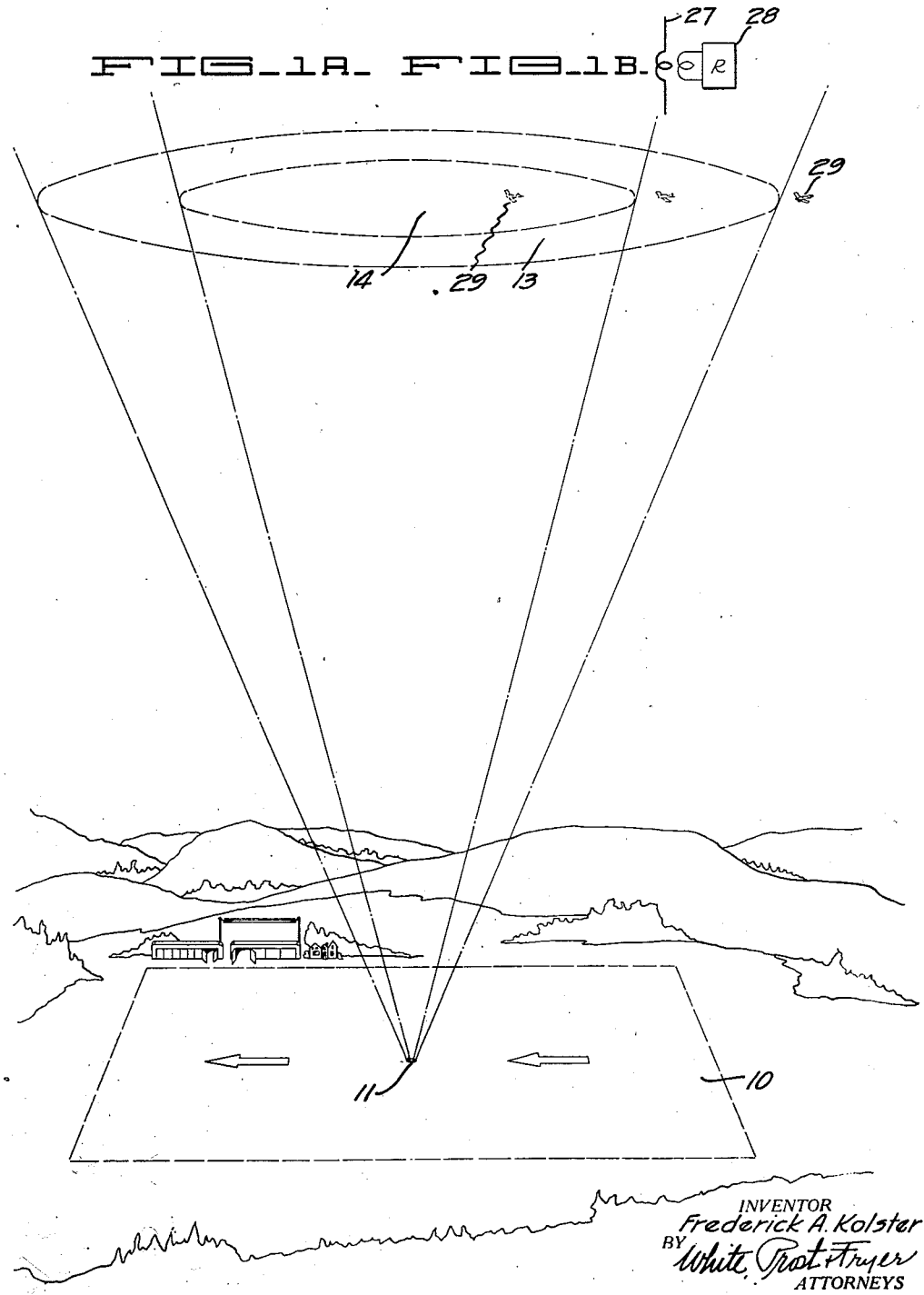

Nov. 10, 1931.  F. A. KOLSTER  1,831,011
RADIO BEACON SYSTEM
Filed June 23, 1928  3 Sheets-Sheet 2
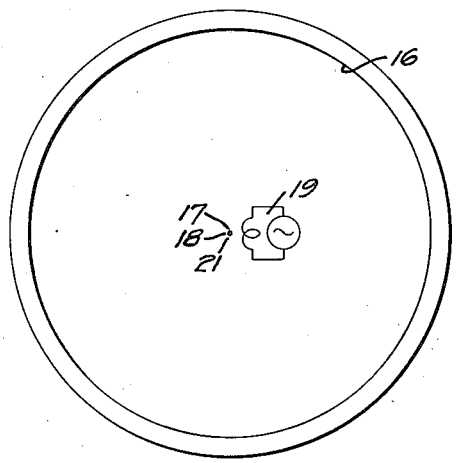
FIG_2_
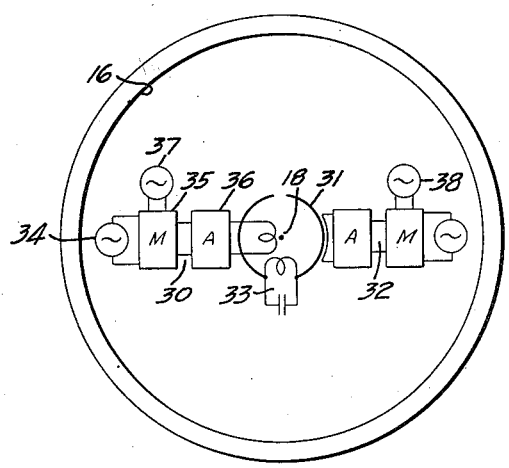
FIG_4_
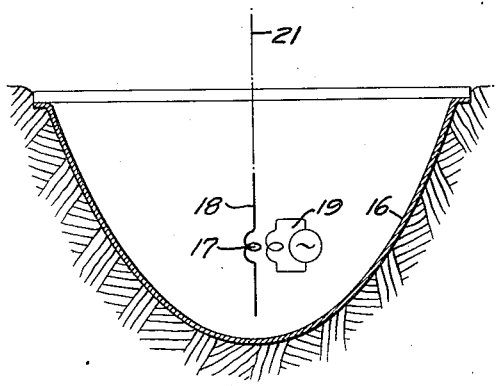
FIG_3_
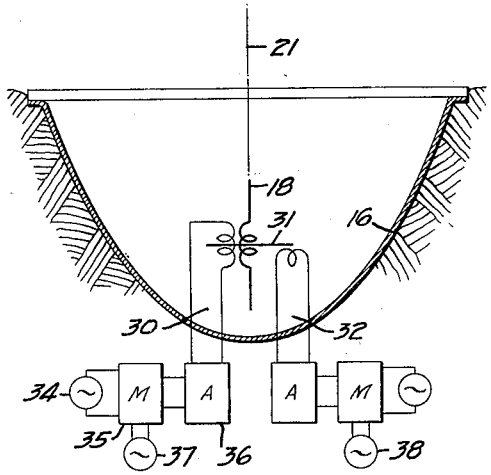
FIG_5_
INVENTOR
Frederick A. Kolster
BY
White, Prost+Tryer
ATTORNEYS Nov. 10, 1931.  F. A. KOLSTER  1,831,011
RADIO BEACON SYSTEM
Filed June 23, 1928   3 Sheets-Sheet 3

INVENTOR
Frederick A. Kolster
BY
White, Prost & Fryer
ATTORNEYS

Patented Nov. 10, 1931

1,831,011

UNITED STATES PATENT OFFICE

FREDERICK A. KOLSTER, OF PALO ALTO, CALIFORNIA, ASSIGNOR TO FEDERAL TELE-GRAPH COMPANY, OF SAN FRANCISCO, CALIFORNIA, A CORPORATION OF CALI-FORNIA

RADIO BEACON SYSTEM

Application filed June 23, 1928. Serial No. 287,810.

This invention relates generally to systems and methods for facilitating aerial navigation, and to apparatus capable of being employed in such systems.

It is an object of this invention to device a system and method of enabling an aerial navigator to make landings regardless of conditions of visibility.

A feature of the invention is means for circumscribing a space extending above an aerial landing field with a distinctively characterized, concentrated field of radio energy.

One of the greatest hazards of present day aerial navigation is in landing when visibility is poor, as when the field is enveloped in fog. It has previously been proposed to employ radio beacons for directing a navigator toward a landing field, but such beacons do not assist the navigator in determining whether or not he is directly above the field. According to the method of this invention I propose to surround a space above the field with a zone of electro-magnetic radiation. This zone of radiation is comparatively concentrated and is directed upwardly from the surface of the earth by suitable apparatus. Upon approaching the landing field, a navigator equipped with proper receiving apparatus enters the zone of radiation and is therefore apprised of the fact that he is close to the field. As the navigator passes thru the zone of radiation, he enters the inner space, and if he remains within the confines of the radiation zone, he may descend and make a safe landing.

Referring to the drawings:

Fig. 1 including A and B is a perspective view illustrating my system and method of aerial navigation.

Figs. 2 and 3 are plan and cross-sectional elevational views, respectively, of apparatus which I prefer to employ in my system and method.

Figs. 4 and 5 are plan and cross-sectional elevational views, respectively, of a modified form of apparatus which I may employ in my system and method.

Figure 6:
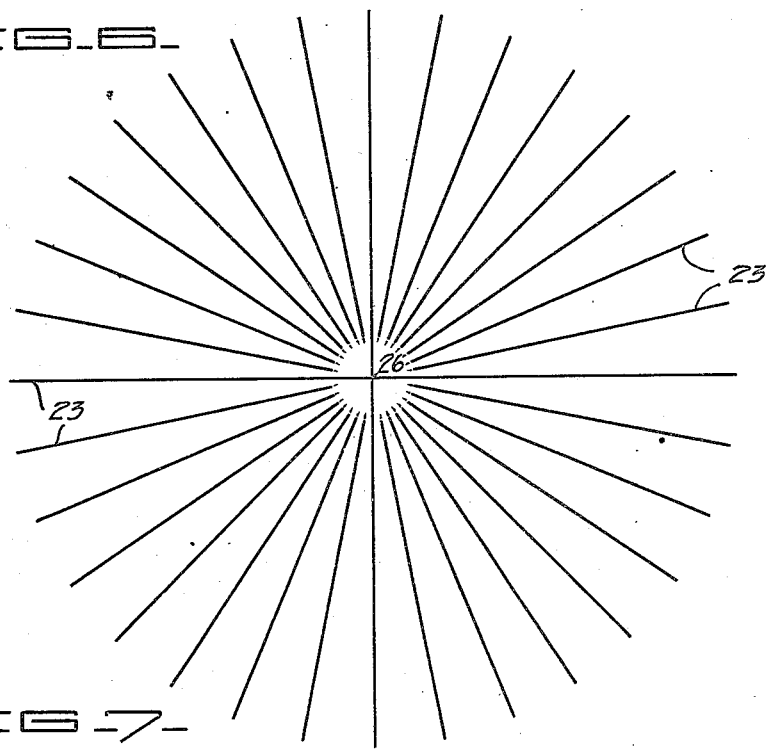
Figs. 6 and 7 are plan and cross-sectional elevational views, respectively, of a model constructed in three dimensions showing the directional characteristics of apparatus such as shown in Figs. 2 and 3.

In Fig. 1 I have shown a conventional aerial landing field 10. Suitable apparatus 11 is provided for projecting upwardly a zone 13 of electromagnetic radiation. Apparatus 11 is constructed in such a manner that zone 13 substantially surrounds or circumscribes an inner space 14 above the landing field 10. Space 14 preferably diverges upwardly, so that its area decreases as the ground is approached.

Apparatus suitable for producing a zone of electromagnetic radiation circumjacent to an inner space, is shown in Figs. 2 and 3. I prefer to employ an electromagnetic wave reflector 16, the surface of this reflector being defined by conductive material. The particular reflector shown is in the form of a paraboloid, that is, a surface defined by a parabola rotated about its axis. Located at the focal center 17 of the reflector, there is an antenna conductor 18, which is coupled to a suitable signaling circuit 19. In order to secure the propagation of a hollow field of radiation, I prefer that conductor 18 be substantially linear and extend substantially coincident with the reflector axis 21. The wave length of energy applied to conductor 18 from the signaling circuit 19, is preferably equal to four times the focal length of the reflector 16. Other wave lengths however may be employed, providing the focal length of the reflector is an odd multiple of a quarter wave length.

I have discovered that with an antenna conductor arranged in the manner described above, the field of radiation is not a solid beam such as is obtained with the apparatus and methods described in the copending application filed in the name of Kolster and Kruesi, Serial No. 279,244, filed May 21, 1928. It should be noted that in this instance the conductor 18 extends substantially parallel to the axis 21 while in the case of the apparatus described in said copending application, the conductor extended upon both sides of axis 21. Furthermore in this instance oscillatory currents surge back and forth in conductor 18 in the same general direction as axis 21, while in the case of my prior apparatus, current flows laterally with respect to axis 21. With the present apparatus, a concentrated field of radiation is produced, but this field is characterized by an inner zone which is substantially conical and in which radiation is practically nil.

Figure 7:
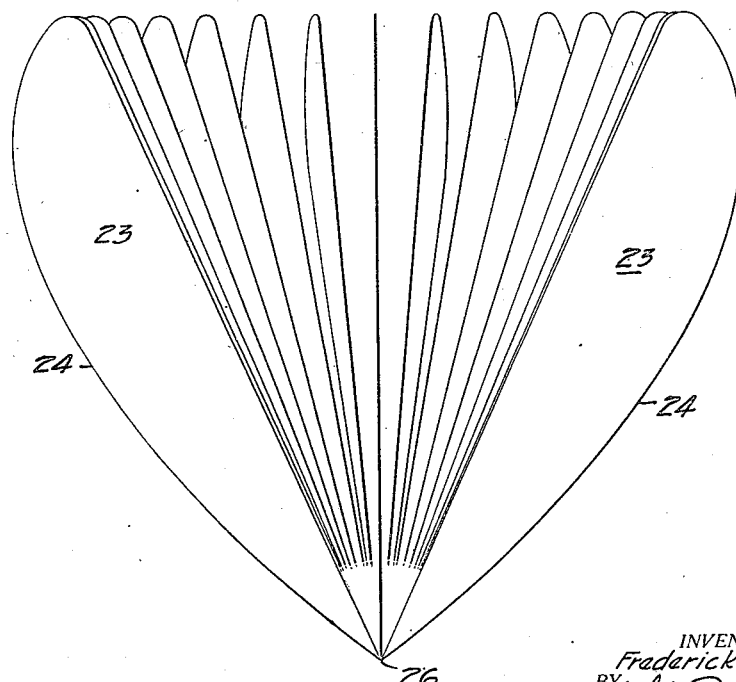

In Figs. 6 and 7 I have shown an actual model made to illustrate the directional characteristics of the apparatus of Figs. 2 and 3, in three dimensions. This model was constructed of a number of cardboard elements 23 retained together in spaced relationship to indicate a three dimension figure. Any point up the contour 24 of these elements receives energy of equal intensity from the reflecting apparatus which is located at the center 26. It will be noted that the inner edges of elements 23 are substantially linear thus showing that the inner space of substantially no radiation is sharply defined.

Referring again to Fig. 1, and assuming that the apparatus 11 is substantially the same as that described with reference to Figs. 2 and 3, it is apparent that radio antenna 27, positioned within the zone of radiation 13, will absorb energy for operating the receiver 28. The receiving antenna 27 is inherently polarized and if it is similar to the conductor 18 of the transmitting apparatus, it should extend substantially parallel to axis 21. Assuming that an aeroplane 29 is equipped with such a receiver, as the plane enters the zone 13, a response is secured in the receiver, thus indicating that the plane is near the landing field. When the plane crosses the zone 13 and enters the inner zone 14, the indication obtained by the energy absorbed from zone 13 ceases and is not again received until the plane has progressed across zone 14 and again enters the opposite side of zone 13. It is of course understood that the radiation of zone 13 is of characteristic quality, for example it can be of a characteristic wave length, it may be coded in a characteristic manner, or can be modulated according to a characteristic signal tone. After definitely determining the zone 14, the navigator may descend to the landing field, utilizing the circumjacent zone 13 to guide him in keeping within zone 14 and above the landing field.

In order to enable a navigator to locate the inner zone 14 with a greater degree of certainty, I prefer to characterize this space by another field of radiation. Preferably this field is such that the navigator may readily distinguish it from the radiation received while in zone 13. The inner radiation field may be formed by another separate reflecting apparatus such as disclosed in said copending application No. 279,244. I have found however that it is possible to utilize a single reflector 16 for propagating both a hollow beam, and an inner beam of radiation. Such an apparatus has been shown in Figs. 4 and 5. In this case the reflector 16 is again equipped with an antenna conductor 18 extending substantially coincident with the reflector axis 21 and coupled to a suitable signaling circuit indicated generally at 30. Likewise positioned at the focal center of reflector 16, there is another antenna conductor 31, which is coupled to another signaling circuit indicated generally at 32, and is capable of projecting substantially a solid beam of radiation. The particular nature of conductor 31 is similar to one of the forms described in said copending application. It consists of a conductor bent to the form of a ring and having reactive phase shifting means 33 interposed intermediate its ends. The two branches of conductor 31 between which phase shifting means 33 is interposed, are preferably equal to substantially one-half the wave length of the energy being employed. By properly adjusting the inductance and capacitance of phase shifting means 33, the current distribution to the two branches of conductor 31 is adjusted so that a potential nodal point falls upon the medial portion of each branch. Signaling circuit 32 is coupled to one branch at such a potential nodal point. A representative form of signaling circuit has been shown diagrammatically as comprising a carrier frequency oscillator 34, modulator 35 and power amplifier 36. To properly characterize the radiation, each of the signaling circuits 30 and 32 may be coded differently or may be modulated in a characteristic way. For example I have shown circuit 30 modulated by an oscillator 37 operating at one tone frequency, and circuit 32 as modulated by oscillator 38 operating at a different tone frequency.

It is apparent that when employing an inner zone of radiation and an outer circumjacent zone of radiation, that a navigator knowing the characteristics of the two zones may readily determine when he is entering zone 13 and when he is within the zone 14. Once within the zone 14 it is a simple matter for the navigator to descend within this zone and make a proper landing. It is obvious that various means may be employed to characterize the radiations of zones 13 and 14. For example in addition to coding the radiations in a characteristic manner, or modulating the tones by different tone frequencies, they may be characteristically modulated by voice frequencies, upon the reception of which a navigator is informed of the particular landing field which he is above, the direction and velocity of the wind or any other conditions which the navigator should know in making a proper landing.

When employing two zones of radiation, it is apparent that the plane should be equipped with receiving apparatus capable of receiving energy from both fields. With the apparatus described the inner beam is polarized differently from the hollow beam and therefore an antenna capable of receiving radiation of any polarity should be employed, or a separate antenna employed in the reception of radiation from the inner beam. Such a separate antenna can be formed by the crossed conductor type of antenna disclosed in said copending application, the conductors extending in a horizontal plan and coupled to a receiver.

I claim:

1. In a method of aerial navigation, the steps of defining a space above the ground by an inner and an outer circumjacent zone of electromagnetic radiation, said zones being capable of effecting different characteristic responses in a receiver.

2. In a method of aerial navigation, the steps of defining a space above the ground by an inner and an outer circumjacent zone of electromagnetic radiation, said radiation being projected upwardly from the ground, said zones being capable of effecting different characteristic responses in a receiver.

3. In a radio system, a signaling circuit, a reflecting surface having an approximate focal point, antenna means located at said focal point and coupled to said circuit, said antenna means comprising a conductor extending in the general direction of the axis of the reflecting surface for a substantial distance.

4. In a radio system in combination, means for projecting a hollow beam of electromagnetic radiation and means for projecting a solid beam of electromagnetic radiation within the hollow beam.

5. The method of producing a radio beacon for the guidance of air craft which comprises projecting radio energy upward from a point on the ground, said method being characterized in that the radiated energy is substantially concentrated in a space defined by the surfaces of two concentric, inverted cones, the apexes of which lies at said point.

6. The method of producing a radio beacon for the guidance of air craft which comprises radiating vertically polarized radio energy and directing substantially all of said energy upward and outward from a point adjacent the ground.

7. The method of producing a radio beacon for the guidance of air craft which comprises directing upward a hollow beam of radio energy and a solid beam of differently characterized radio energy within said hollow beam.

8. Means for producing a radio beacon comprising a reflecting surface having at least an approximate focal point and an axis of symmetry, a radiating conductor lying along said axis and adjacent said focal point, a second radiating conductor extending at an angle at said axis and positioned adjacent said focal point, and means for energizing said conductors with differently characterized electric waves.

In testimony whereof, I have hereunto set my hand.

FREDERICK A. KOLSTER.